(No Model.)
J. A. WUMMER.
TAP COCK.
No. 539,324. Patented May 14, 1895.
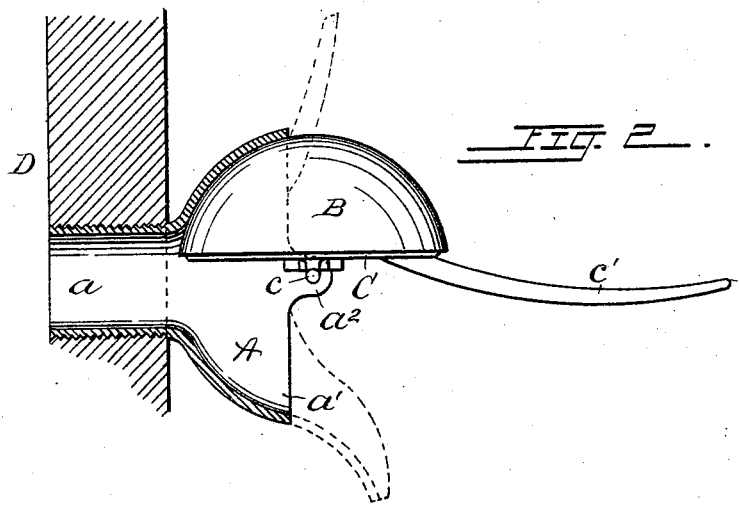
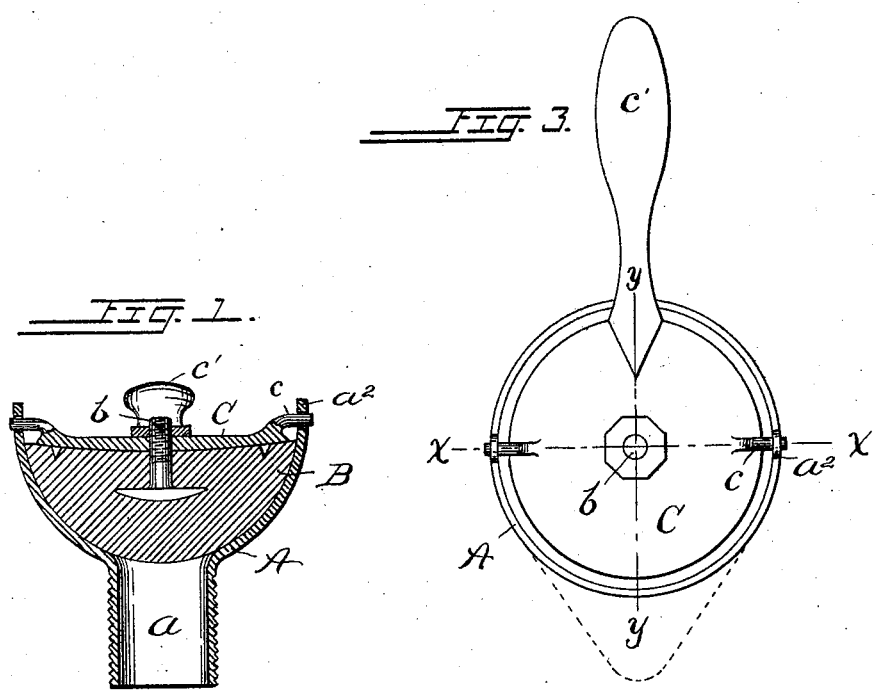
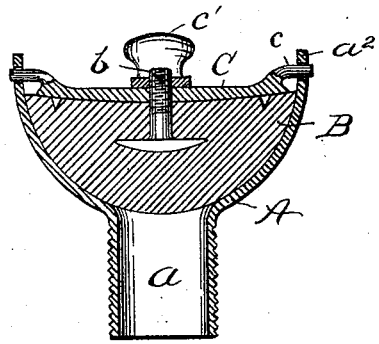
Witnesses
Jacob A. Wummer, Inventor
By Attorney

UNITED STATES PATENT OFFICE.

JACOB A. WUMMER, OF READING, PENNSYLVANIA.

TAP-COCK.

SPECIFICATION forming part of Letters Patent No. 539,324, dated May 14, 1895.

Application filed March 26, 1894. Serial No. 505,087. (No model.)

*To all whom it may concern:*

Be it known that I, JACOB A. WUMMER, a citizen of the United States, residing at Reading, county of Berks, State of Pennsylvania, have invented certain Improvements in Tap-Cocks, of which the following is a specification.

My invention relates to an improved form of cock or faucet and my main object is to provide a simple and inexpensive device which may be readily operated and which will not be liable to get out of order or clogged.

A further object is to avoid all unnecessary projection from the wall of the vessel to which it is attached, thereby reducing the liability of injuring the device and at the same time presenting a neat and compact appearance.

The invention is fully described in connection with the accompanying drawings and is specifically pointed out in the claim.

Figure 1 is a sectional elevation of the device, taken on line X X of Fig. 3. Fig. 2 is a similar section of the casing on the line Y Y of Fig. 3, the valve being shown full and partly opened and the wall of the vessel to which it is attached being indicated. Fig. 3 is a front view of the device, showing the valve closed.

A represents the valve casing which is formed with a tubular stem $a$ adapted to enter the wall D of the vessel to which it is secured, the stem being provided if desired with an exterior screw thread as shown. This tubular stem is expanded at its outer end to form a spherical or bell-shaped mouth $a'$, the inner face of which forms the valve seat.

The main body of the valve B as represented is formed preferably of india rubber or similar elastic yielding material, in hemispherical shape corresponding with the mouth of the casing. The outer face of the valve as shown consists of a metal plate C which is firmly fixed to the main body of the valve by means of a bolt $b$ molded solidly in the latter. This plate is formed with a suitable handle $c'$ and with opposite trunnions $c$ which are arranged in engagement with pivoting ears $a^2$ on the casing A. The trunnions $c\,c$ are readily entered in the pivot holes or removed therefrom, when the valve is turned so as to bring the body B entirely outside of the casing A, but are arranged so as to cause the valve to press tightly against the spherical seat $a'$ when turned to the positions indicated in the drawings.

In Fig. 2 the valve is shown wide open so as to permit a free flow of material from the vessel to which it is attached. As the handle $c'$ is turned upward and backward to its normal vertical position, as indicated in Fig. 3 and by dotted lines in Fig. 2, the valve first gradually closes the outlet from the stem $a$ and then sweeps clean the lower portion of the spherical seat $a'$ forcing outward any of the material which would otherwise adhere thereto and insuring a clean tight seat.

It will be noticed that my improved device presents a neat and compact appearance and is very simple both in construction and operation. For thin liquids the casing may be extended beyond the bell mouth as indicated by dotted lines $e$ Figs. 2 and 3 so as to form any desired shape of nozzle. It is evident also that other modifications may be made without departing from the spirit of my invention and I do not therefore desire to limit myself to the exact construction shown, but

What I claim is—

The combination with the casing having a tubular stem enlarged at its outer end to form a spherical valve seat, and pivoting ears, of a valve, comprising a rigid plate journaled in said pivoting ears and provided with a suitable handle and a separately-formed hemispherical portion of resilient material firmly attached to said plate and adapted to bear upon said valve seat.

In testimony whereof I affix my signature in presence of two witnesses.

JACOB A. WUMMER.

Witnesses:
W. G. STEWART,
ADAM B. RIESER.